US008613250B1

United States Patent
Pruitt et al.

(10) Patent No.: US 8,613,250 B1
(45) Date of Patent: Dec. 24, 2013

(54) ANGLED FRYING PAN STAND

(76) Inventors: Brian A. Pruitt, Keizer, OR (US); Maleeia T. Pruitt, Keizer, OR (US)

( * ) Notice: Subject to any disclaimer, the term of this patent is extended or adjusted under 35 U.S.C. 154(b) by 61 days.

(21) Appl. No.: 13/417,217

(22) Filed: Mar. 10, 2012

(51) Int. Cl.
- *A47J 27/00* (2006.01)
- *F16L 3/00* (2006.01)
- *A47F 7/00* (2006.01)
- *F16M 11/00* (2006.01)
- *A47J 37/10* (2006.01)
- *A23B 5/00* (2006.01)

(52) U.S. Cl.
USPC .......... 99/444; 99/425; 99/422; 99/495; 248/176.2; 248/121; 248/125.7

(58) Field of Classification Search
USPC ........ 108/150, 161, 1, 8, 139, 7; 99/425, 422, 99/495; 248/118.3, 121, 124.2, 125.9, 248/125.7, 316.1, 288.31, 230.1, 313, 689, 248/480, 139
See application file for complete search history.

(56) References Cited

U.S. PATENT DOCUMENTS

| | | | |
|---|---|---|---|
| 2,871,848 A | 2/1959 | Wall et al. | |
| 2,903,229 A | 9/1959 | Lange | |
| 3,713,619 A * | 1/1973 | Marty | 248/425 |
| 5,187,744 A * | 2/1993 | Richter | 379/449 |
| 5,315,983 A | 5/1994 | Law | |
| 5,850,779 A | 12/1998 | Zimmerman | |
| 5,903,645 A * | 5/1999 | Tsay | 379/455 |
| 6,129,318 A * | 10/2000 | Paulse | 248/118.3 |
| 6,161,806 A * | 12/2000 | Crosson | 248/118.3 |
| 7,607,387 B2 * | 10/2009 | Stanczak | 99/425 |
| 7,661,421 B1 * | 2/2010 | Lustig et al. | 126/215 |
| 2008/0017048 A1 * | 1/2008 | Donnellan | 99/425 |
| 2009/0111600 A1 * | 4/2009 | Crossley | 473/279 |
| 2011/0038999 A1 * | 2/2011 | Lara et al. | 426/438 |

\* cited by examiner

*Primary Examiner* — Joshua J Michener
*Assistant Examiner* — Erin W Smith (57) ABSTRACT

An angled frying pan stand that includes a truncated cylindrical tilt stand rotatably disposed upon a generally circular base, the tilt stand having a bottom side and an upper surface, the upper surface disposed at an acute angle relative the bottom side, each of a pair of side supports retractably extendable upon an extendible track portion disposed on a sidewall, with a first holding edge and a second holding edge configured to support an extant frying pan at an angle upon the top surface, the angled frying pan stand including a strainer piece removably attachable over the rim of a frying pan to partition a segment of the frying pan wherein grease may collect under the influence of gravity separated from any foodstuffs in the pan.

8 Claims, 6 Drawing Sheets

ANGLED FRYING PAN STAND

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of angled frying pan stands are known in the prior art. However, what is needed is an angled frying pan stand that includes a truncated cylindrical tilt stand rotatably disposed upon a generally circular base, the tilt stand having a bottom side and an upper surface, the upper surface disposed at an acute angle relative the bottom side, each of a pair of side supports retractably extendable upon an extendible track portion disposed on a sidewall, with a first holding edge and a second holding edge configured to support an extant frying pan at an angle upon the top surface, the angled frying pan stand including a strainer piece removably attachable over the rim of a frying pan to partition a section of the frying pan wherein grease may collect under the influence of gravity separated from any foodstuffs in the pan.

FIELD OF THE INVENTION

The present invention relates to an angled frying pan stand, and more particularly, to an angled frying pan stand that includes a truncated cylindrical tilt stand rotatably disposed upon a generally circular base, the tilt stand having a bottom side and an upper surface, the upper surface disposed at an acute angle relative the bottom side, each of a pair of side supports retractably extendable upon an extendible track portion disposed on a sidewall, with a first holding edge and a second holding edge configured to support an extant frying pan at an angle upon the top surface, the angled frying pan stand including a strainer piece removably attachable over the rim of a frying pan to partition a section of the frying pan wherein grease may collect under the influence of gravity separated from any foodstuffs in the pan.

SUMMARY OF THE INVENTION

The general purpose of the angled frying pan stand, described subsequently in greater detail, is to provide an angled frying pan stand which has many novel features that result in an angled frying pan stand which is not anticipated, rendered obvious, suggested, or even implied by prior art, either alone or in combination thereof.

The present invention has been devised as a convenient stand for a user to place a frying pan upon after cooking. The angled frying pan stand supports an extant frying pan at an angle such that grease in the pan drains under the influence of gravity into a section of the pan partitioned from the remaining pan by means of a strainer piece removably inserted onto the pan rim to section the pan into to unequal segments. Thusly, grease may be separated from foodstuffs cooked in the pan without having to hold the pan at an angle for prolonged periods—the pan may be set upon the angled frying pan stand and the food removed from the pan after a short interval of time has elapsed, enough time for the grease to drain into the partitioned segment of the pan.

The present angled frying pan stand includes a generally circular base and a truncated cylindrical tilt stand. The base includes an underside and an upper side. A plurality of feet members is disposed on the base underside, each of the plurality of feet members configured to provide additional stability to the device when placed on an extant surface such as a kitchen countertop.

The tilt stand includes a bottom side rotatably disposed atop the base upper side, a top surface disposed at an acute angle relative the bottom side, a top edge disposed circumferentially around the top surface, and a sidewall vertically disposed between the bottom side and the top surface. The sidewall has a height disposed between a minimum edge, where the top surface is closest to the bottom side and the sidewall is the narrowest, and a maximum edge, where the top surface is farthest from the bottom side and the sidewall is the widest.

A pair of extendible side supports is disposed opposite each other on the top edge. Each of the pair of extendible side supports is disposed upon an extendible track portion which slidingly moves into and alternately out of the tilt stand within a plane parallel with the top surface. Each of the pair of extendible side supports is therefore moveable laterally with respect to the top surface in order to accommodate a frying pan with a diameter greater than the diameter of the top surface.

A first holding edge is disposed upwardly upon the top edge proximal the sidewall minimum edge and a second holding edge is likewise disposed upon the top edge spaced-apart from the first holding edge. The first holding edge and the second holding edge are disposed on either side of the sidewall minimum edge and are spaced apart from each other to accommodate a frying pan having a second handle disposed thereon. Thusly, a frying pan may be set upon the top surface, the pair of extendible side supports extended as needed to accommodate a diameter exceeding the diameter of the top surface, and the first holding edge and the second holding edge support the frying pan at an angle.

The strainer piece includes a first strainer and a second strainer. Each of the first strainer and the second strainer include a horizontal top bar having a first end and a second end. An outer strut is disposed vertically downward from the first end. A support strut is disposed proximal the first end, but spaced apart from the outer strut creating a space between the outer strut and the support strut. A mesh section is disposed vertically between the top bar and the support strut.

The first strainer and the second strainer are releasably connectable and slidingly engage together. The top bar of the first strainer has a track channel disposed thereon and the top bar of the second strainer has a track bead disposed thereon. The track bead slidingly mates with the track channel, and the first strainer slidingly engages with the second strainer creating a horizontal barrier attachable to a frying pan. The outer strut is positioned on the outside of a rim of the frying pan and the support strut is positioned on the inside of the rim. Thusly the strainer piece sections a segment of the frying pan proximal to the sidewall minimum edge.

The outer strut of each of the first strainer and the second strainer abuts the respective first holding edge and the second holding edge and the strainer piece is held in a position as a secant sectioning a segment of the frying pan proximal the sidewall minimum edge.

Thus has been broadly outlined the more important features of the present angled frying pan stand so that the detailed description thereof that follows may be better understood and in order that the present contribution to the art may be better appreciated.

Objects of the present angled frying pan stand, along with various novel features that characterize the invention are particularly pointed out in the claims forming a part of this disclosure. For better understanding of the angled frying pan stand, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 8 thereof, example of the instant angled frying pan stand employing the principles and concepts of the present angled frying pan stand and generally designated by the reference number 10 will be described.

Referring to FIGS. 1 through 8 a preferred embodiment of the present angled frying pan stand 10 is illustrated.

The angled frying pan stand 10 includes a generally circular base 20 and a truncated cylindrical tilt stand 22. The base 20 includes an underside 24 and an upper side 26. A plurality of feet members 28 is disposed on the underside 24 of the base 20, the plurality of feet members 28 configured to stabilize the base 20 upon an extant surface such as a kitchen countertop.

The tilt stand 22 is rotatably disposed atop the base 20. The tilt stand 22 swivels upon the upper side 26 of the base 20 through 360 degrees in a plane parallel the upper side 26. The tilt stand 22 includes a bottom side 30 rotatably disposed atop the upper side 26 of the base 20, a sloped top surface 32 disposed at an acute angle relative the bottom side 30, a top edge 34 disposed circumferentially around the top surface 32, and a sidewall 36 vertically disposed between the bottom side 30 and the top surface 34. The sidewall has a height disposed between a minimum edge 38, wherein the top edge 34 is disposed closest the bottom side 30 and the sidewall 36 is the narrowest, and a maximum edge 40, wherein the top edge 34 is disposed farthest from the bottom side 30 and the sidewall 36 is the widest.

Each of a pair of extendible side supports 42 is disposed opposite each other on the top edge 34 midway between the sidewall minimum edge 38 and the sidewall maximum edge 40. Each of the pair of extendible side supports 42 includes an overhanging wall section 44, a lower wall portion 46, and an extendible track portion 48 disposed on the lower wall portion 46, the extendible track portion 48 disposed in a plane parallel with the top surface 32. The extendible track portion 48 is slidingly moveable into and alternately out of the tilt stand 22. The overhanging wall section 44 slidingly engages with the top surface 32 and the lower wall portion 46 slidingly abuts the sidewall 36. Each of the pair of extendible side supports 42 is therefore extendible laterally outwards from the tilt stand 22 in a plane parallel with the top surface 32 to accommodate an extant frying pan 70 having a diameter larger than the diameter of the top surface 32 (see FIG. 5).

A first holding edge 50 and a second holding edge 52 are vertically disposed upwardly on the top edge 34 on either side of the sidewall 36 minimum edge 38. Each of the first holding edge 50 and the second holding edge 52 is disposed proximal the sidewall 36 minimum edge 38, but spaced-apart therefrom in order that an extant frying pan 70 with a second handle 72 may be stood on the tilt stand 22 (see FIG. 2).

A strainer piece 54 is included, the strainer piece 54 releasably attachable to an extant frying pan 70. The strainer piece 54 includes a first strainer 56 and a second strainer 58. Each of the first strainer 56 and the second strainer 58 includes a horizontal top bar 60 having a first end 62 and a second end 64. An outer strut 66 is disposed vertically down from the first end 62 and a support strut 68 is disposed vertically down from the top bar 60, the support strut 68 spaced-apart from the outer strut 66, the support strut 68 disposed proximal to the outer strut 66. A rectangular mesh section 70 is disposed vertically between the top bar 60 and the support strut 68. An embodiment is provided having a curvilinear outer strut 66 for use with frying pans with a curvilinear cross-section (see FIG. 8).

The top bar 60 of each of the first strainer 56 and the second strainer 58 slidingly releasably engage to removably attach the strainer piece 54 to an extant frying pan 100. The rim 104 of the frying pan 100 releasably inserts between the outer strut 66 and the support strut 68 disposed on each of the first strainer 56 and the second strainer 58. The top bar 60 of the first strainer 56 has a track channel 72 and the top bar 60 of the second strainer 58 has a track bead 74. The track bead 74 slidingly mates with the track channel 72 and the second strainer 58 slidingly engages with the first strainer 56 when the track bead 74 is releasably inserted into the track channel 72 (see FIG. 8).

Figure 1:
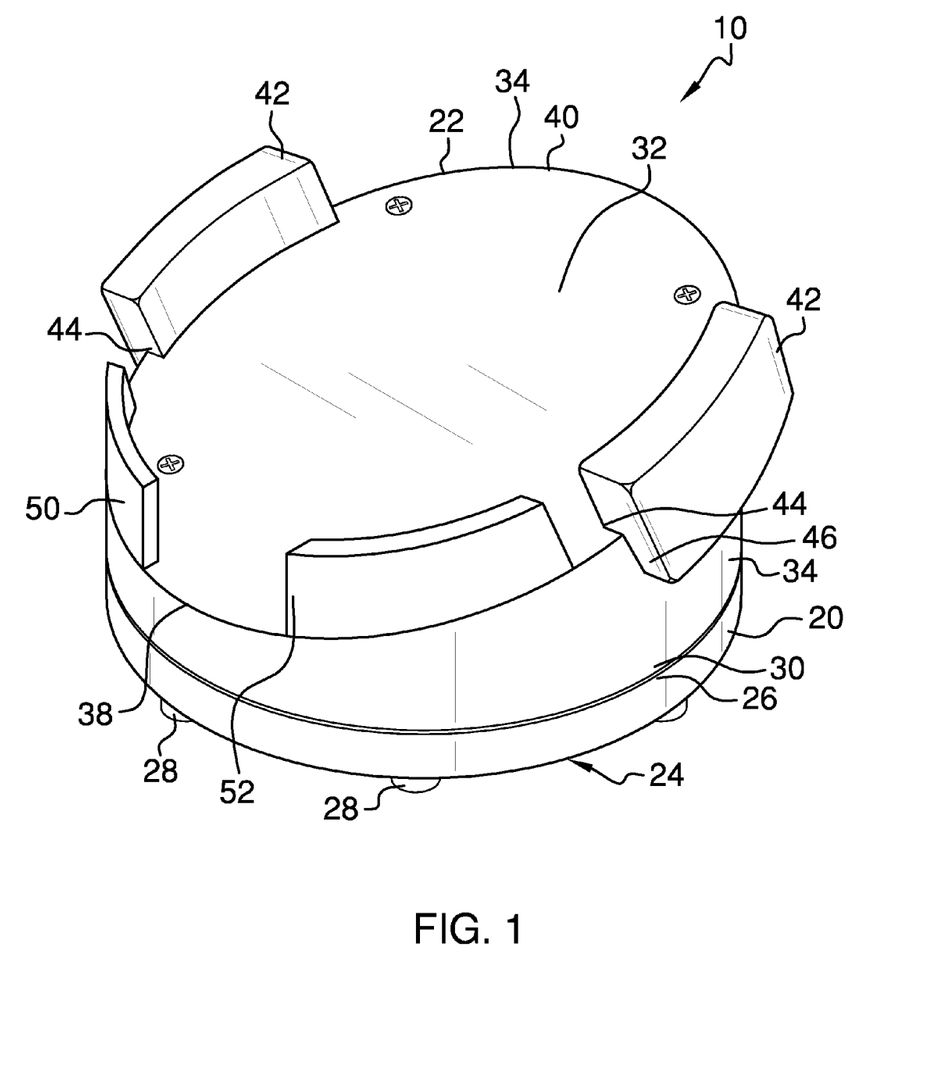
FIG. 1 is an isometric view.
Figure 2:
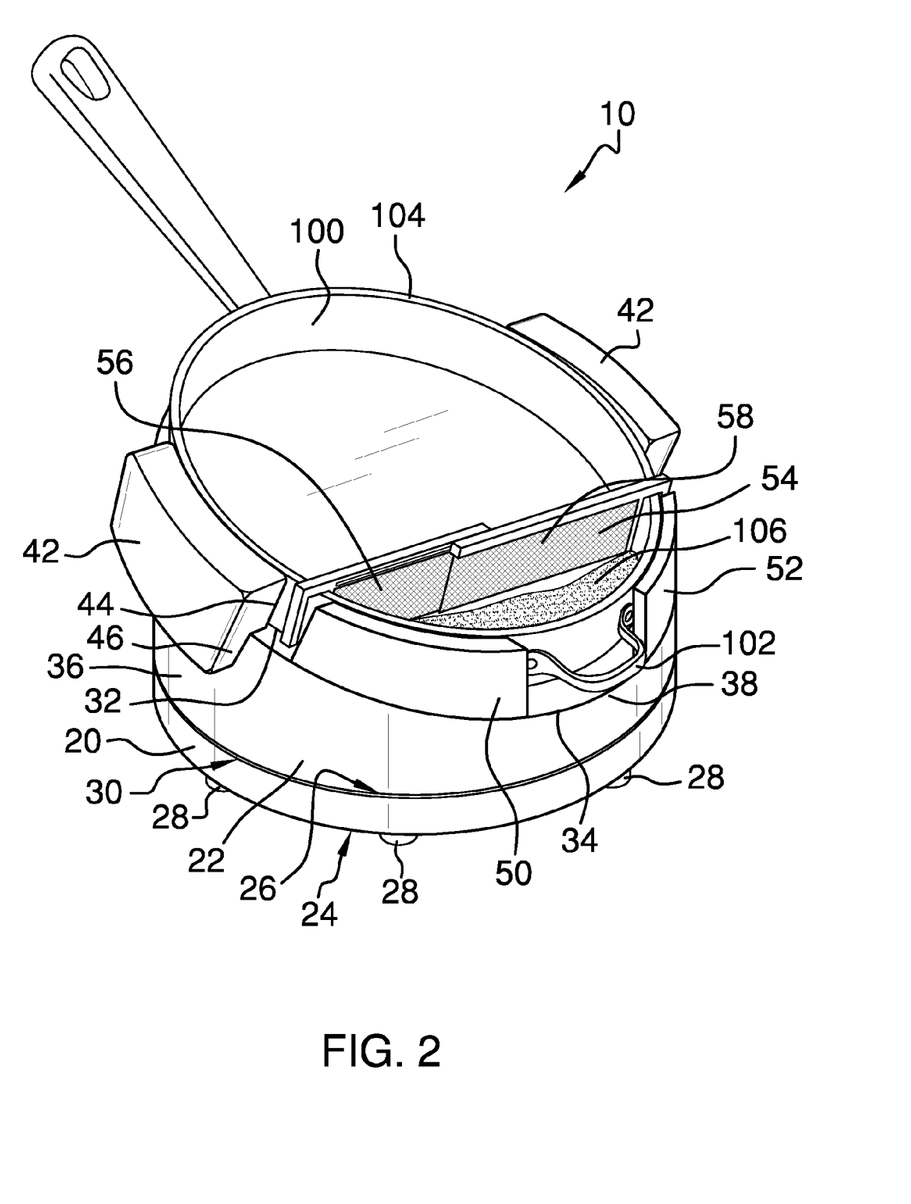
FIG. 2 is an in-use isometric view.
Figure 3:
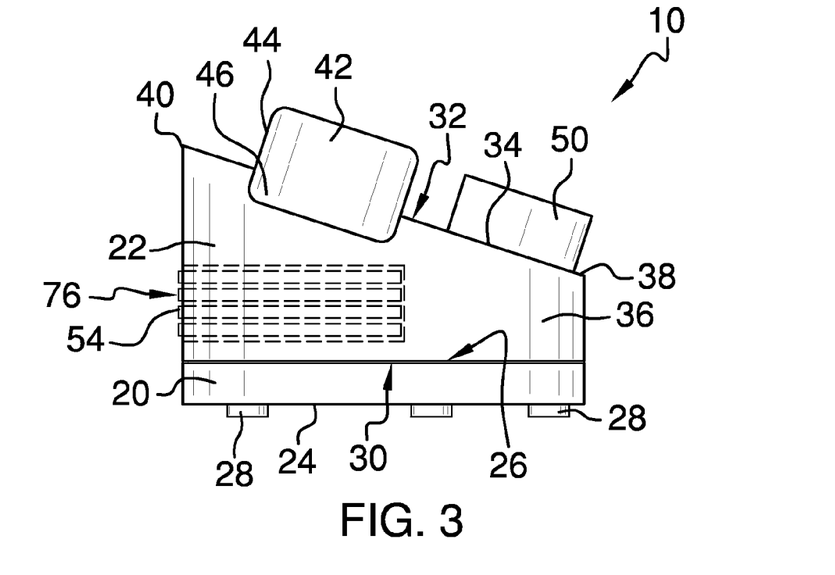
FIG. 3 is a side view.
Figure 4:
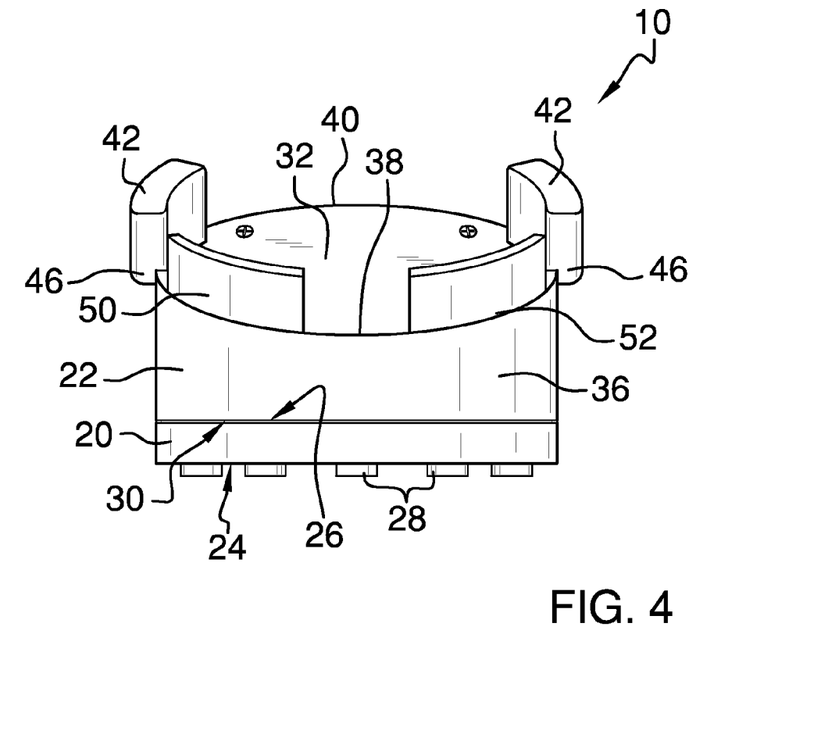
FIG. 4 is a front view illustrating a sidewall minimum edge.
Figure 5:
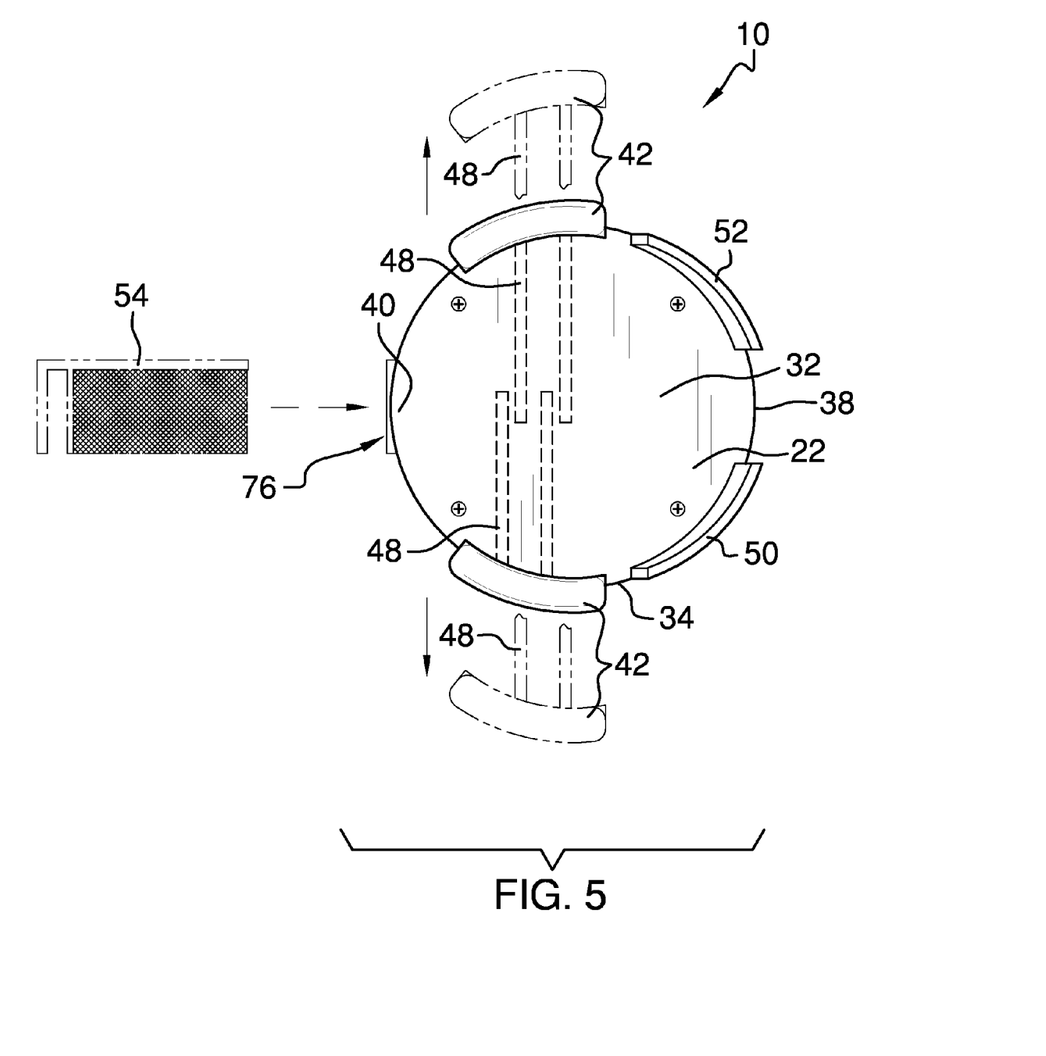
FIG. 5 is a top view.
Figure 6:
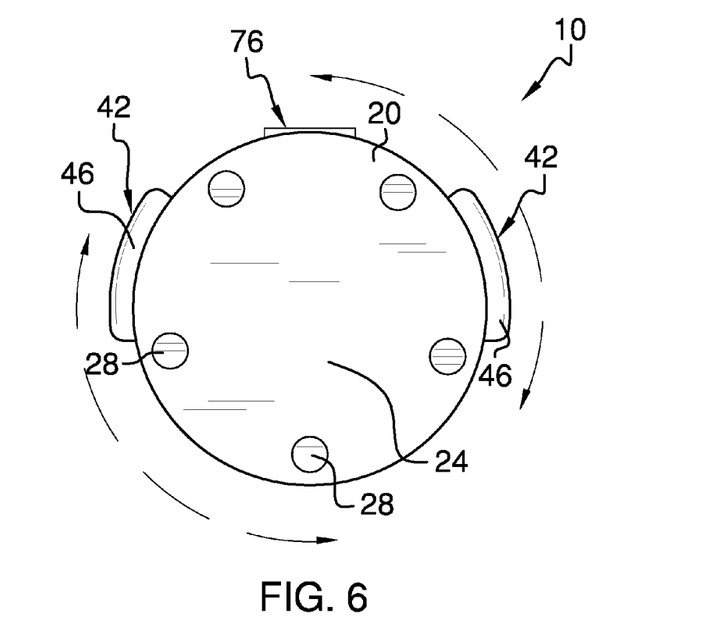
FIG. 6 is a bottom view.
Figure 7:
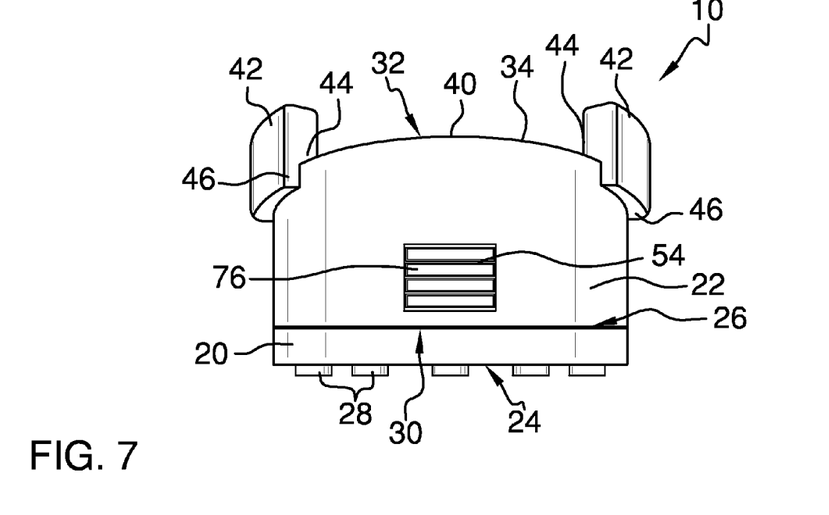
FIG. 7 is a back view illustrating a sidewall maximum edge.
Figure 8:
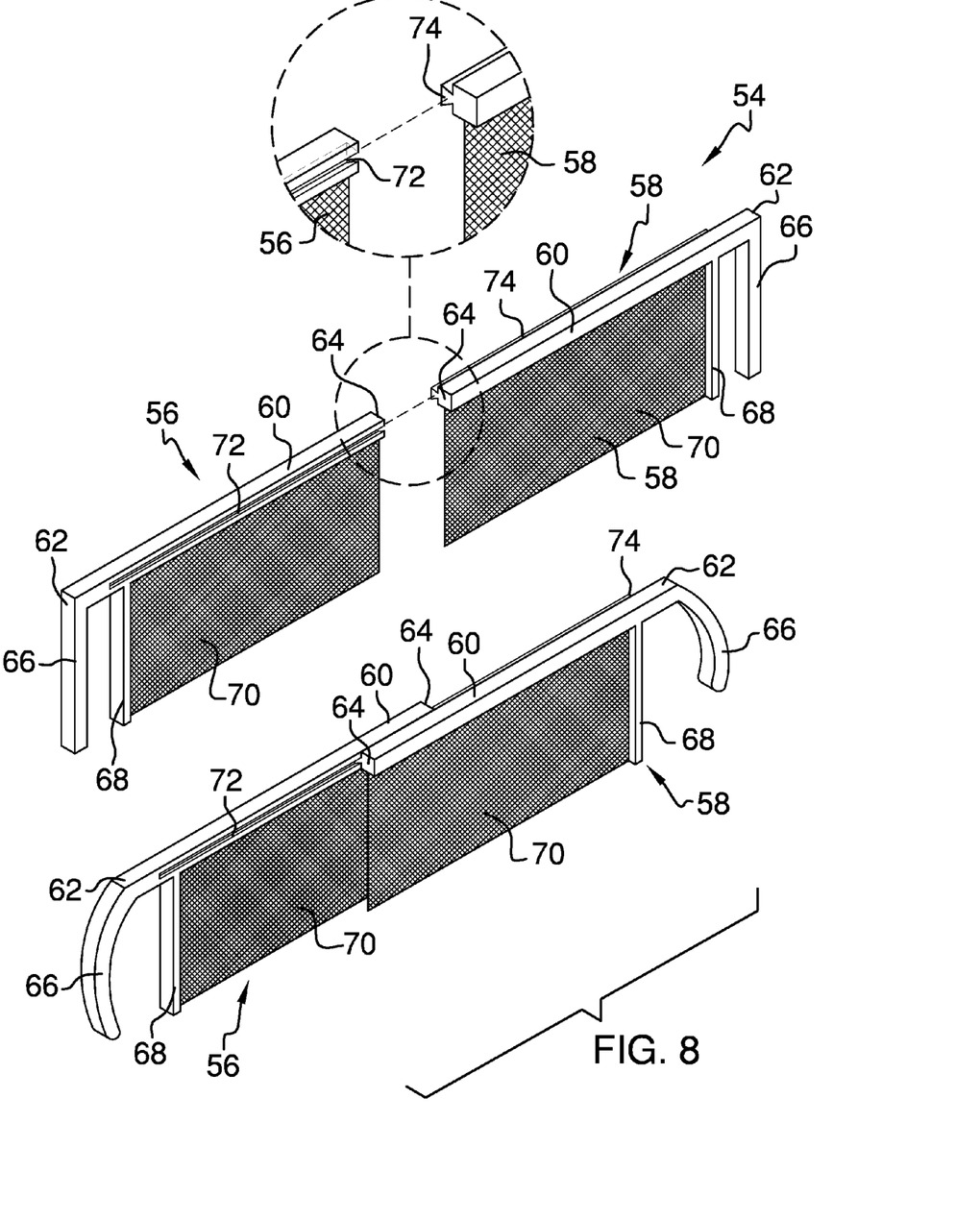
FIG. 8 is a detail view of a strainer piece.

The outer strut 66 of each of the first strainer 56 and second strainer 58 abuts the respective first holding edge 50 and the second holding edge 52 when the strainer piece is removably attached to a frying pan 100 and the frying pan 100 is placed on the tilt stand 22 (see FIG. 2). Thusly, the strainer piece 54 sections a segment of the frying pan 100 proximal to the sidewall 36 minimum edge 38, into which segment grease 106 may drain under the influence of gravity, and any foodstuffs in the pan 100 are held above the strainer piece 54.

A storage compartment 76 is provided. The storage compartment 76 is disposed within the sidewall 36 proximal the sidewall maximum edge 40, the storage compartment 76 configured to releasably receive the strainer piece 54. The storage compartment 76 is disposed in the tilt stand 22 beneath the extendible track portion 48 of the each of the pair of extendible side supports 42. The strainer piece 54 is removably inserted into the storage compartment 76 with the first strainer 56 and the second strainer 58 placed adjacent one another, and the strainer piece 54 may be retrieved therefrom and assembled for use.

What is claimed is:

1. An angled frying pan stand comprising:
   a generally circular base comprising an underside and an upper side;
   a plurality of feet members disposed on the underside of the base;
   a truncated cylindrical tilt stand rotatably disposed atop the base, the tilt stand swiveling upon the upper side through 360 degrees in a plane parallel the upper side, the tilt stand comprising:

a bottom side rotatably disposed atop the upper side of the base;

a sloped top surface disposed at an acute angle relative the bottom side;

a top edge disposed circumferentially around the top surface;

a sidewall vertically disposed between the bottom side and the top surface;

a strainer piece releasably attachable to an extant frying pan;

wherein an extant frying pan is supported atop the top surface at an acute angle relative the base and the strainer piece releasably attaches to the frying an to partition a segment of the frying pan;

wherein the side wall has a height disposed between a minimum edge and a maximum edge, wherein the top edge is disposed closest the bottom side and the sidewall is the narrowest at the minimum edge and the top edge is disposed farthest the bottom side and the sidewall is the widest at the maximum edge;

wherein the tilt stand further comprises a first holding edge and a second holding edge vertically disposed upwardly on the top edge, each of the first holding edge and the second holding edge disposed proximal the sidewall minimum edge;

wherein the tilt stand further comprises a pair of extendible side supports, each of the pair of extendible side supports disposed opposite each other on the top edge the extendible side supports comprising:

an overhanging wall section;

a lower wall portion;

an extendible track portion disposed on the lower wall portion, the extendible track portion disposed in a plane parallel with the top surface, the track portion slidingly moveable into and alternately out of the tilt stand;

wherein the overhanging wall section slidingly engages with the top surface and each of the pair of extendible side supports is extendible laterally outwards from the tilt stand in a plane parallel with the top surface;

wherein the strainer piece comprises a first strainer and a second strainer, each of the first strainer and the second strainer comprising:

a horizontal top bar having a first end and a second end;

an outer strut disposed vertically down from the first end;

a support strut disposed vertically down from the top bar, the support strut disposed spaced-apart from the outer strut, the support strut disposed proximal to the outer strut;

a rectangular mesh section disposed vertically between the top bar and the support strut;

wherein the first strainer and the second strainer top bars slidingly releasably engage to removably attach the strainer piece to an extant frying pan.

2. The angled frying pan stand of claim 1 wherein the top bar of the first strainer further comprises a track channel and the top bar of the second strainer further comprises a track bead, wherein the track bead slidingly mates with the track channel and the second strainer slidingly engages with the first strainer when the track bead is releasably inserted into the track channel.

3. The angled frying pan stand of claim 2 wherein the outer strut of each of the first strainer and second strainer rests outside an extant frying pan when each of the first strainer and second strainer is releasably applied to the frying pan, the outer strut of each of the first strainer and second strainer abutting the first holding edge and the second holding edge respectively, wherein the strainer piece partitions a segment of the frying pan proximal to the sidewall minimum edge.

4. The angled frying pan stand of claim 3 wherein the first holding edge and the second holding edge are spaced apart on either side of the sidewall minimum edge.

5. The angled frying pan stand of claim 4 wherein the tilt stand further comprises a storage compartment disposed within the sidewall proximal the sidewall maximum edge, the storage compartment configured to releasably receive the strainer piece.

6. An angled frying pan stand comprising:

a generally circular base comprising an underside and an upper side;

a plurality of feet members disposed on the underside of the base;

a truncated cylindrical tilt stand rotatably disposed atop the base, the tilt stand swiveling upon the upper side through 360 degrees in a plane parallel the upper side, the tilt stand comprising:

a bottom side rotatably disposed atop the upper side of the base;

a sloped top surface disposed at an acute angle relative the bottom side;

a top edge disposed circumferentially around the top surface;

a sidewall vertically disposed between the bottom side and the top surface, the sidewall having a height disposed between a minimum edge and a maximum edge, wherein the top edge is disposed closest the bottom side and the sidewall is the narrowest at the minimum edge and the top edge is disposed farthest the bottom side and the sidewall is the widest at the maximum edge;

a pair of extendible side supports, each of the pair of extendible side supports disposed opposite each other on the top edge midway between the sidewall minimum edge and the sidewall maximum edge, each of the extendible side supports comprising:

an overhanging wall section;

a lower wall portion;

an extendible track portion disposed on the lower wall portion, the extendible track portion disposed in a plane parallel with the top surface, the track portion slidingly moveable into and alternately out of the tilt stand;

a strainer piece releasably attachable to an extant frying pan, the strainer piece comprising:

a first strainer and a second strainer, each of the first strainer and the second strainer comprising:

a horizontal top bar having a first end and a second end;

an outer strut disposed vertically down from the first end;

a support strut disposed vertically down from the top bar, the support strut spaced-apart from the outer strut, the support strut disposed proximal to the outer strut;

a rectangular mesh section disposed vertically between the top bar and the support strut;

wherein the first strainer and the second strainer top bars slidingly releasably engage to removably attach to an extant frying pan;

a storage compartment disposed within the sidewall proximal the sidewall maximum edge, the storage compartment configured to releasably receive the strainer piece;

wherein the angled frying pan support stand supports an extant frying pan at an angle, the strainer piece partitions a section of the frying pan proximal the sidewall minimum edge, the first and second holding edges extend to accommodate an extant frying pan having a diameter larger than the diameter of the top surface, and the tilt stand rotatably swivels through 360 degrees, whereby grease is separated from foodstuffs cooked in the pan.

7. The angled frying pan stand of claim 5 wherein the top surface consists of a heat resistant material.

8. The angled frying pan stand of claim 7 wherein the plurality of feet members are manufactured from a polymeric material.

\* \* \* \* \*